(12) United States Patent
Kunert et al.

(10) Patent No.: US 7,549,658 B2
(45) Date of Patent: Jun. 23, 2009

(54) WHEEL SUSPENSION

(75) Inventors: Reinhard Kunert, Weissach (DE);
Swen Zschocke, Schoenerstadt (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 473 days.

(21) Appl. No.: 11/364,033

(22) Filed: Mar. 1, 2006

(65) Prior Publication Data
US 2006/0197301 A1 Sep. 7, 2006

(30) Foreign Application Priority Data
Mar. 2, 2005 (DE) .................. 10 2005 009 430

(51) Int. Cl.
*B60G 11/18* (2006.01)
*B60G 11/20* (2006.01)
*B60G 11/50* (2006.01)

(52) U.S. Cl. .............. 280/124.167; 280/124.166; 280/124.137; 280/124.145; 280/124.165; 267/273; 267/277; 267/188; 267/190

(58) Field of Classification Search ............ 280/124.13, 280/124.137, 124.145, 124.152, 124.165, 280/124.166, 124.167; 267/273, 274, 277, 267/278, 188, 190, 191
See application file for complete search history.

(56) References Cited

U.S. PATENT DOCUMENTS

| 402,789 | A | * | 5/1889 | Waterhouse | 267/273 |
|---|---|---|---|---|---|
| 2,330,482 | A | * | 9/1943 | Fageol | 280/124.167 |
| 3,025,078 | A | * | 3/1962 | Allison | 280/124.137 |
| 3,337,236 | A | * | 8/1967 | Peterson | 280/124.101 |
| 3,652,104 | A | * | 3/1972 | Chabek | 280/124.137 |
| 3,831,966 | A | * | 8/1974 | Grosseau | 280/124.137 |
| 4,272,101 | A | * | 6/1981 | Chambon | 280/124.152 |
| 4,465,156 | A | * | 8/1984 | Richardson et al. | 180/227 |
| 4,540,197 | A | | 9/1985 | Finn et al. | |
| 4,804,198 | A | * | 2/1989 | Imai et al. | 280/21.1 |
| 4,919,441 | A | * | 4/1990 | Marier et al. | 280/21.1 |
| 4,973,077 | A | * | 11/1990 | Kuwayama et al. | 280/124.107 |
| 5,360,078 | A | * | 11/1994 | Rifenburg et al. | 180/227 |
| 5,641,175 | A | * | 6/1997 | Maeda et al. | 280/124.137 |
| 5,687,960 | A | * | 11/1997 | Moon | 267/273 |
| 5,702,121 | A | * | 12/1997 | Song | 280/124.152 |
| 5,716,042 | A | * | 2/1998 | Derviller | 267/274 |
| 5,839,741 | A | * | 11/1998 | Heyring | 280/124.106 |
| 6,357,771 | B1 | * | 3/2002 | Clements et al. | 280/124.13 |
| 6,767,021 | B2 | * | 7/2004 | Schnurpel | 280/124.13 |
| 2002/0125675 | A1 | * | 9/2002 | Clements et al. | 280/124.152 |
| 2002/0190493 | A1 | | 12/2002 | Schnurpel | |

FOREIGN PATENT DOCUMENTS

| DE | 1 022 478 | | 1/1958 |
|---|---|---|---|
| EP | 1 157 863 | A2 | 11/2001 |
| GB | 598002 | | 2/1948 |
| GB | 2 187 524 | A | 9/1987 |
| JP | 2-117409 | A | 5/1990 |
| JP | 2-117410 | A | 5/1990 |

* cited by examiner

*Primary Examiner*—Eric Culbreth
*Assistant Examiner*—Barry Gooden, Jr.

(57) ABSTRACT

To achieve a low wheel spring rate at low wheel loads and a higher wheel spring rate at higher wheel loads, each wheel of a rear-wheel suspension is equipped with a torsion bar spring which cooperates by way of a pressure rod connected with the wheel carrier. An adjusting device is connected with the torsion bar spring to act upon an additional spring element which can take up a controlled elastic position or a blocked position.

5 Claims, 2 Drawing Sheets

WHEEL SUSPENSION

This application claims the priority of DE 10 2005 009 430.9, filed Mar. 2, 2005, the disclosure of which is expressly incorporated by reference herein.

BACKGROUND AND SUMMARY OF THE INVENTION

The present invention relates to a motor vehicle wheel suspension having wheel suspension links and a torsion bar suspension.

In a text by Reimpell, Jörnsen (1st Edition, 1986), p. 307, a rear axle for a motor vehicle is shown having short torsion bars interactingly connected with a wheel suspension. Specifically, the rear axle of Renault Models 9 and 11 with short torsion bars and a screwed-on stabilizer is illustrated (Illustration 7.4/2). As described therein, the accommodation of longer bars is more difficult, which bars are required when the suspension is soft and the travels are large. This relates to the older Renault models 4 and 5 Le Car (as well as the earlier constructions 6, 14 and 16, which had low spring rates of $c_h$=10.5 N/mm and travels of up to $s_g$=287 mm. Renault places the bars behind one another and accepts a wheel base which is different on the left and on the right (Illustrations 7.4/2 to 7.4/4)—a simple solution which results in no driving-related disadvantages. Eccentrics at the ends of the torsion bars are used for adjusting the vehicle height—as shown at the right top of Illustration 7.4/2.

In contrast to Renault, as that text discloses the firms of the PSA Group have retained long bars extending to the other vehicle side. For reasons of accommodation and because of the higher swing center in the case of the "City-Laster", Talbot provides crossed torsion bars (illustrated in the "Steering" volume).

An object of the present invention is to provide a wheel suspension having a torsion bar spring so that a different wheel spring rate can be achieved.

According to the present invention, this object has been achieved by a torsion bar spring which is oriented to the longitudinal direction of the vehicle and is supported in bearings on the vehicle body, is connected by way of an angle lever fastened to the torsion bar spring with a pressure rod held at the wheel carrier in an articulated manner and extending in the transverse direction of the vehicle, and the torsion bar spring has an adjusting device held at the free end, which adjusting device interacts with a spring element.

Among the principal advantages achieved with the present invention are that, at low loads, that is, during rebounding operations, two connected springs are used, specifically a torsion bar spring and a spring element, such as a coil spring connected behind one another. At higher loads, i.e., during compression operations, the spring element is bridged by an adjusting device, and only the torsion bar spring is still operative. This is achieved through a torsion bar spring, which is oriented in the longitudinal direction of the vehicle and is supported in bearings on the vehicle body, being connected by an angle lever with a pressure rod held in an articulated manner on a wheel carrier and extending in the transverse direction of the vehicle. The torsion bar spring has an adjusting device which is held at its free end and which interacts with a spring element.

Furthermore, according to the present invention, the adjusting device comprises an angle lever held on the torsion bar spring. The angle lever is interactingly connected by an adjusting rod with the spring element. The adjusting rod cooperates with a distance sleeve which holds the spring element in position between a sleeve collar and an abutment at the vehicle body. As a result of this arrangement, by way of the pressure rod, which is connected with a wheel carrier in an articulated manner, an adjusting effect is exercised directly on the torsion bar spring and thus also on the adjusting device for the spring element, specifically as a function of wheel deflection operations.

According to the present invention, the spring element is, for example, a coil spring which, during wheel deflection operations, can be adjusted in an elastic position at lower wheel loads at low spring rates to a blocked position at higher wheel loads with high spring rates. As a result of these two possible positions of the spring element with intermediate positions, the spring element can be connected in a simple manner, on one hand, at low wheel loads, as in the case of rebounding operations, and cooperates with the torsion bar spring. On the other hand, at higher wheel loads, as in the case of compression operations, the spring element is disconnected, and only the torsion bar spring can still operate. For this purpose, in the elastic position, the spring element is constructed to be series connected with the torsion bar spring and, in the blocked position, the spring element is deactivated and the distance sleeve is supported at the abutment and the torsion bar spring forms a single spring element.

Other objects, advantages and novel features of the present invention will become apparent from the following detailed description of the invention when considered in conjunction with the accompanying drawings.

DETAILED DESCRIPTION OF THE DRAWINGS

Figure 2:
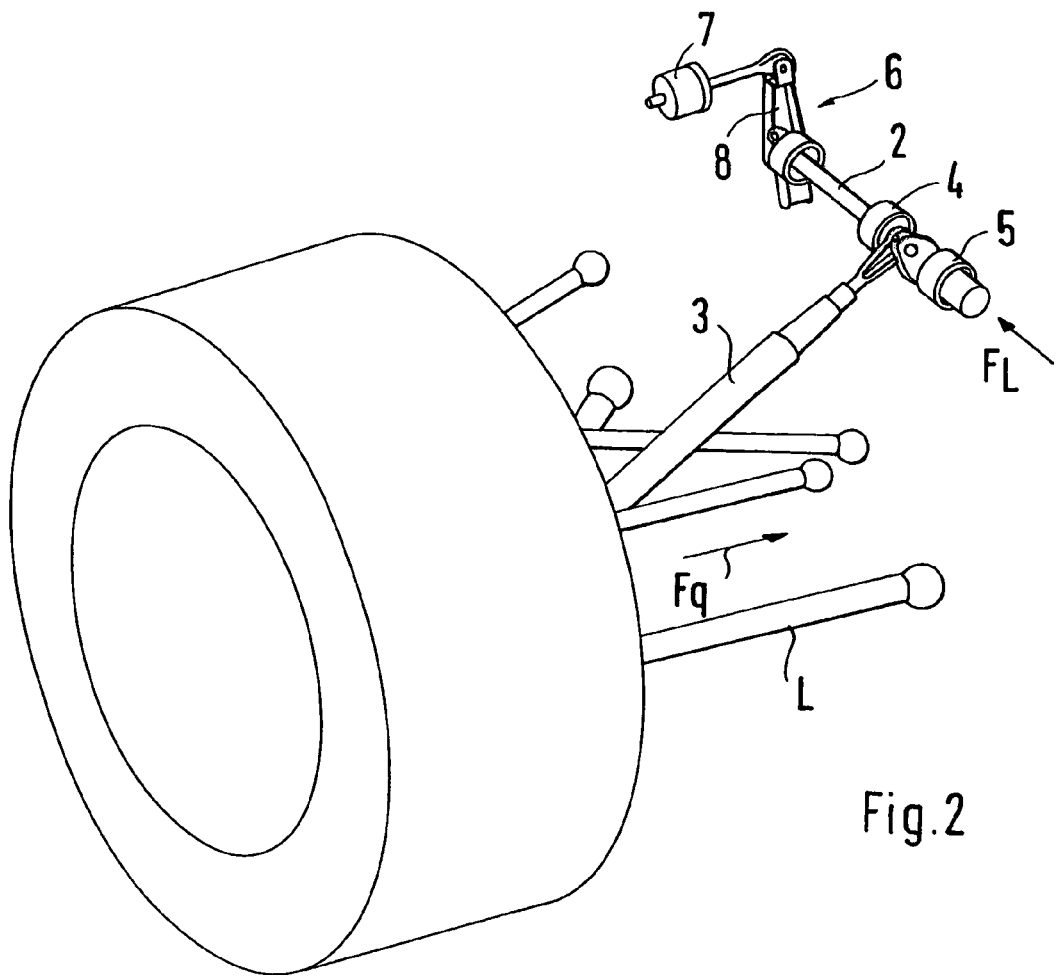
FIG. 2 is a perspective view of the wheel suspension according to FIG. 1.

A wheel suspension, particularly a rear-wheel suspension for a motor vehicle, additionally has one torsion bar spring 2 respectively for a wheel as shown in FIG. 2. The torsion bar spring 2 is connected with a pressure rod 3 by an angle lever 3a shown in Figure, the pressure rod 3 being disposed in an articulated manner on the wheel carrier. The torsion bar spring 2 is held in bearings 4, 5 on the vehicle body side, between which the angle lever 3a is arranged. An adjusting device designated generally by numeral 6 for a spring element 7 is arranged at the end side of the torsion bar spring 2 at the free end facing away from the bearings 4, 5.

Figure 1:
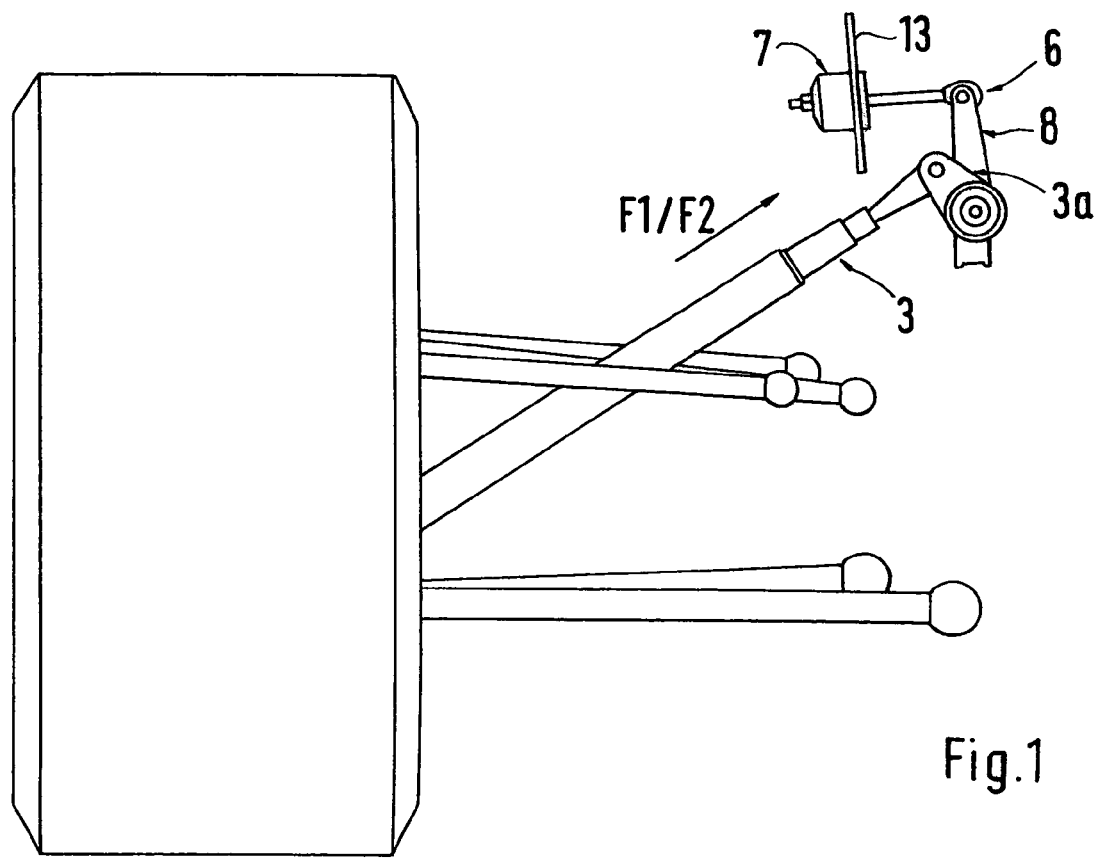
FIG. 1 is a front view of a wheel suspension having a torsion bar spring, and adjusting device and a spring element according to the present invention.
Figure 3:
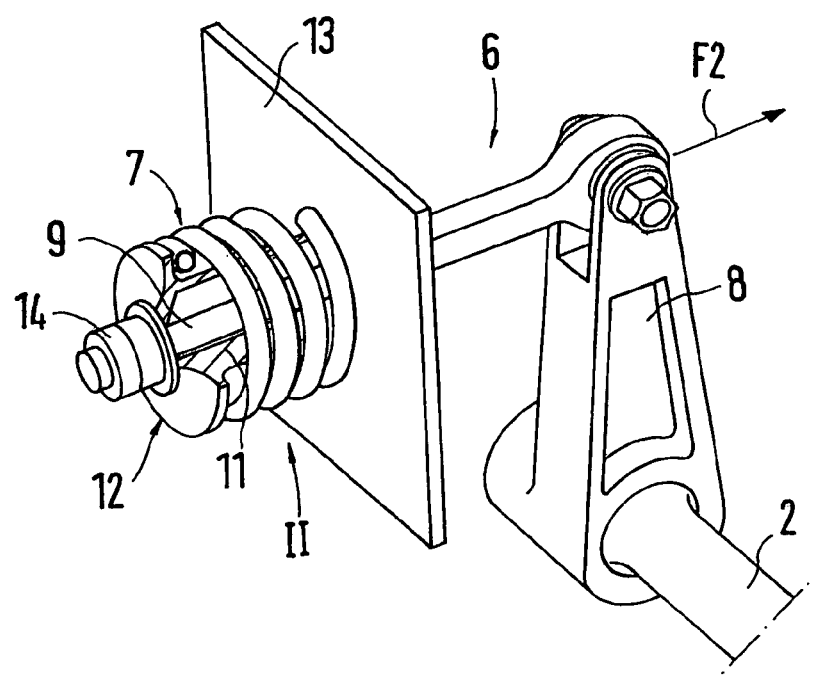
FIG. 3 is a perspective view of the adjusting device shown in FIGS. 1 and 2 with the spring element in a blocked position.
Figure 4:
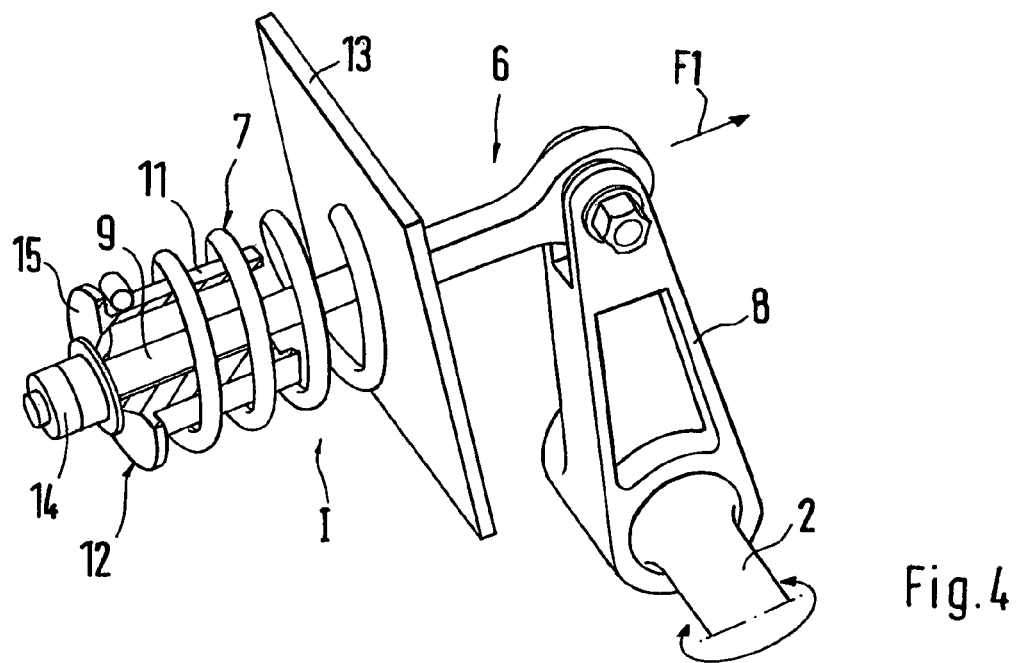
FIG. 4 is a perspective view of the adjusting device shown in FIGS. 1 through 3, but with the spring element in an elastic position.

As seen in FIGS. 3 and 4, the adjusting device 6 includes an angle lever 8 which is fixedly connected to the torsion bar spring 2 and is held in an articulated manner on an adjusting rod 9 which interacts with a distance sleeve 11 on which the spring element 7 is arranged. The spring element 7 is disposed between a sleeve collar 12 of the distance sleeve 11 and a body-side abutment 13 of the vehicle. For the connection with the adjusting rod 9 penetrating the distance sleeve 11, the adjusting rod 9 has a supporting element 14 on the end side for the cover plate 15 of the distance sleeve 11.

The torsion bar spring 2 extends in the longitudinal direction FL of the vehicle, and the pressure rod 3 extends with respect to the torsion bar spring 2 in the transverse direction Fq of the vehicle. The torsion bar spring 2 according to the present invention can be oriented according to the orientation and linkage of the individual wheel suspension links L, so that the illustrated arrangement of the torsion bar spring 2 with the pressure rod 3 represents only one example of the contemplated construction using the present invention.

During a wheel compressing or rebounding movement, the torsion bar spring 2 is correspondingly rotated by way of the pressure rod 3 via the angle lever 3a fixedly connected with the torsion bar spring 2. Thereby, via the adjusting device 6, the spring element 7 on the distance sleeve 11 can be adjusted into a an elastic position I (FIG. 4) as well as into a blocked position II (FIG. 3).

FIG. 4 shows the elastic position I, in which the spring element 7 is relaxed and has a spring effect. This elastic position I is taken up at low wheel loads F1. The additional possible blocked position II shown in FIG. 3 is taken up at higher wheel loads F2, in which the spring element 7 is disconnected because the adjusting rod 9 has pulled the spring element 7 by way of the distance sleeve 11 into a blocked position. Now, the torsion bar spring can continue to be loaded by torsion.

A coil spring or an elastic element can be used as the spring element 7. According to another embodiment, the coil spring may have a square or rectangular shape in the cross-section of the turns, in which case the distance sleeve 11 will then be deactivated. In a blocked position of the spring, it is thereby achieved that the turns of the spring 7 are situated directly on one another without the distance sleeve 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle wheel suspension having wheel suspension links and a torsion bar suspension, comprising a torsion bar spring oriented in a motor vehicle longitudinal direction, supported in bearings on a motor vehicle body, and operatively connected by an angle lever fastened to the torsion bar spring to a pressure rod held at a wheel carrier in an articulated manner and extending in a motor vehicle transverse direction, wherein the torsion bar spring has an adjusting device operatively held at a free end thereof to interact with a spring element, wherein the adjusting device comprises an angle lever operatively connected with the torsion bar spring and further connected by way of an adjusting rod with the spring element operatively configured to take up an elastic position and blocked position, and wherein the adjusting rod is operatively connected with a distance sleeve configured to hold the spring element between a sleeve collar and an abutment at the motor vehicle body.

2. Wheel suspension according to claim 1, wherein the spring element comprises a coil spring and, during wheel deflection operations, is configured to be adjustable from the elastic position at low wheel loads with a low spring rate to the blocked position at high wheel loads and high wheel spring rates.

3. Wheel suspension according to claim 1, wherein the distance sleeve has a length shorter than that of the spring element in the elastic position when the spring element is relaxed, and the distance sleeve is supported at the abutment in the blocked position.

4. Wheel suspension according to claim 1, wherein, in the elastic position, the spring element is series connected with the torsion bar spring.

5. Wheel suspension according to claim 1, wherein, in the blocked position, the spring element deactivated, the distance sleeve is supported on the abutment and the torsion bar spring forms a single spring element.

\* \* \* \* \*